(12) United States Patent
O'Donnell et al.

(10) Patent No.: US 7,831,496 B2
(45) Date of Patent: Nov. 9, 2010

(54) FINANCIAL INSTRUMENT PROVIDING A GUARANTEED GROWTH RATE AND A GUARANTEE OF LIFETIME PAYMENTS

(75) Inventors: Robert Francis O'Donnell, Harwinton, CT (US); Marc Joseph Buzzelli, Flanders, NJ (US); Robert Alan Fishbein, Tenafly, NJ (US); Jacob M. Herschler, Southport, CT (US); Fiona Alexandra Jackman-Ward, Milford, CT (US); Daniel O. Kane, Florham Park, NJ (US); N. David Kuperstock, Woodbridge, CT (US); Gary E. Phifer, III, Princeton, NJ (US); Steven Lee Putterman, West Hartford, CT (US); Polly Rae, Trumbull, CT (US); Dain Eric Runestad, Woodbridge, CT (US); Robert J. Schwartz, West Granby, CT (US); Christopher Patrick Shecklev, Branford, CT (US)

(73) Assignee: Prudential Insurance Company of America, Newark, NJ (US)

( * ) Notice: Subject to any disclaimer, the term of this patent is extended or adjusted under 35 U.S.C. 154(b) by 595 days.

(21) Appl. No.: 11/404,979

(22) Filed: Apr. 14, 2006

(65) Prior Publication Data

US 2007/0100715 A1 May 3, 2007

Related U.S. Application Data

(60) Provisional application No. 60/703,630, filed on Jul. 29, 2005.

(51) Int. Cl.
*G06Q 40/00* (2006.01)

(52) U.S. Cl. ..................................... 705/36 R; 705/35

(58) Field of Classification Search .................. None
See application file for complete search history.

(56) References Cited

U.S. PATENT DOCUMENTS 4,742,457 A      5/1988   Leon et al.

(Continued)

FOREIGN PATENT DOCUMENTS

WO        WO 92/22036        12/1992

OTHER PUBLICATIONS

Herschler, Jacob; Sandvold, Terry; Demystifying Variable Annuities; Life Insurance Selling; vol. 79, No. 9, pp. 35-36, 38 (Sep. 2004).*

(Continued)

*Primary Examiner*—Hani Kazimi
*Assistant Examiner*—Virpi H Kanervo
(74) *Attorney, Agent, or Firm*—Baker Botts L.L.P.

(57) ABSTRACT

A method for providing a financial instrument includes determining an initial account balance associated with a financial instrument based upon an initial deposit amount, wherein the financial instrument includes an account with an account balance that changes over time. The method further includes establishing a first guarantee of a protected value, the protected value including at least an amount based upon the initial account balance growing at a minimum growth rate for a defined period of time or until one or more defined events occur, whichever is sooner; and establishing a second guarantee that a beneficiary may periodically receive a transfer of an amount of money for the life of a designated party, wherein the amount comprises a percentage of the protected value at the time of a particular event, provided that the amount may vary based upon withdrawals from the account in excess of a first particular limit.

39 Claims, 5 Drawing Sheets

U.S. PATENT DOCUMENTS

| | | | |
|---|---|---|---|
| 5,126,936 A | 6/1992 | Champion et al. | |
| 5,148,365 A | 9/1992 | Dembo | |
| 5,185,696 A | 2/1993 | Yoshino et al. | |
| 5,214,579 A * | 5/1993 | Wolfberg et al. | 705/36 R |
| 5,291,398 A | 3/1994 | Hagan | 364/408 |
| 5,631,828 A | 5/1997 | Hagan | |
| 5,754,980 A | 5/1998 | Anderson et al. | 705/14 |
| 5,812,987 A | 9/1998 | Luskin et al. | |
| 5,893,071 A | 4/1999 | Cooperstein | 705/4 |
| 5,933,815 A | 8/1999 | Golden | 705/35 |
| 6,064,969 A | 5/2000 | Haskins | 705/4 |
| 6,064,986 A | 5/2000 | Edelman | 705/36 |
| 6,208,978 B1 | 3/2001 | Walker et al. | |
| 6,213,390 B1 | 4/2001 | Oneda | |
| 6,219,650 B1 | 4/2001 | Friend et al. | |
| 6,253,192 B1 | 6/2001 | Corlett et al. | 756/36 |
| 6,275,807 B1 | 8/2001 | Schirripa | 705/4 |
| 6,278,983 B1 | 8/2001 | Ball | |
| 6,343,272 B1 | 1/2002 | Payne et al. | 705/4 |
| 6,360,210 B1 | 3/2002 | Wallman | |
| 6,415,267 B1 | 7/2002 | Hagan | 705/35 |
| 6,592,030 B1 | 7/2003 | Hardesty | 235/380 |
| 6,611,808 B1 | 8/2003 | Preti et al. | 705/4 |
| 6,611,815 B1 * | 8/2003 | Lewis et al. | 705/36 R |
| 6,615,180 B1 | 9/2003 | Anderton et al. | 705/4 |
| 6,615,188 B1 | 9/2003 | Breen et al. | |
| 6,636,834 B1 | 10/2003 | Schirripa | 705/4 |
| 7,089,201 B1 | 8/2006 | Dellinger et al. | |
| 7,249,077 B2 | 7/2007 | Williams et al. | |
| 7,308,429 B1 | 12/2007 | Tozzi | |
| 7,398,241 B2 * | 7/2008 | Fay et al. | 705/36 R |
| 7,457,776 B1 | 11/2008 | Caruso et al. | |
| 2001/0014873 A1 | 8/2001 | Henderson et al. | 705/35 |
| 2002/0156710 A1 | 10/2002 | Ryder | 705/35 |
| 2002/0174042 A1 | 11/2002 | Arena et al. | |
| 2002/0188540 A1 | 12/2002 | Fay et al. | 705/36 |
| 2002/0194098 A1 | 12/2002 | Stiff et al. | 705/36 |
| 2003/0004844 A1 | 1/2003 | Hueler | 705/35 |
| 2003/0014285 A1 | 1/2003 | Richard | 705/4 |
| 2003/0083972 A1 | 5/2003 | Williams | 705/36 |
| 2003/0088430 A1 | 5/2003 | Ruark | 705/1 |
| 2003/0105690 A1 | 6/2003 | Brown et al. | 705/35 |
| 2003/0120570 A1 | 6/2003 | Dellinger et al. | 705/35 |
| 2003/0154161 A1 | 8/2003 | Stahl et al. | 705/38 |
| 2003/0187764 A1 * | 10/2003 | Abbs et al. | 705/35 |
| 2003/0233301 A1 | 12/2003 | Chen et al. | 705/36 |
| 2004/0078244 A1 | 4/2004 | Katcher | 705/4 |
| 2004/0088236 A1 | 5/2004 | Manning | 705/35 |
| 2004/0148202 A1 | 7/2004 | Siefe et al. | 705/4 |
| 2004/0158517 A1 * | 8/2004 | Mahaney et al. | 705/36 |
| 2004/0172350 A1 | 9/2004 | Atkinson et al. | 705/35 |
| 2004/0177022 A1 | 9/2004 | Williams et al. | 705/36 |
| 2004/0199418 A1 * | 10/2004 | Hertz et al. | 705/10 |
| 2004/0215493 A1 * | 10/2004 | Koppes et al. | 705/4 |
| 2004/0225536 A1 * | 11/2004 | Schoen et al. | 705/4 |
| 2004/0230610 A1 | 11/2004 | Gutierrez-Sheris | |
| 2005/0021363 A1 | 1/2005 | Stimson et al. | |
| 2005/0060251 A1 * | 3/2005 | Schwartz et al. | 705/35 |
| 2005/0065809 A1 | 3/2005 | Henze | 705/1 |
| 2005/0086085 A1 | 4/2005 | Berlin et al. | 705/4 |
| 2005/0086144 A1 * | 4/2005 | Lang | 705/35 |
| 2005/0144124 A1 | 6/2005 | Stiff et al. | 705/39 |
| 2005/0187840 A1 * | 8/2005 | Stiff et al. | 705/35 |
| 2005/0234747 A1 | 10/2005 | Kavanaugh | 705/4 |
| 2005/0234821 A1 | 10/2005 | Benham et al. | 705/40 |
| 2005/0256748 A1 | 11/2005 | Gore et al. | 705/4 |
| 2005/0278200 A1 | 12/2005 | Brawley et al. | 705/4 |
| 2006/0015429 A1 | 1/2006 | Sullivan et al. | |
| 2006/0041453 A1 * | 2/2006 | Clark et al. | 705/4 |
| 2006/0111997 A1 * | 5/2006 | Abbott et al. | 705/35 |
| 2006/0122874 A1 | 6/2006 | Postrel | |
| 2006/0178966 A1 | 8/2006 | Jung et al. | |
| 2006/0259390 A1 | 11/2006 | Rosenberger | |
| 2007/0011063 A1 * | 1/2007 | Shelon et al. | 705/35 |
| 2007/0011086 A1 | 1/2007 | Dellinger et al. | 705/38 |
| 2007/0050217 A1 | 3/2007 | Holden | |
| 2007/0100715 A1 | 5/2007 | O'Donnell et al. | |
| 2007/0100727 A1 | 5/2007 | Multer et al. | |
| 2007/0198377 A1 | 8/2007 | Livingston et al. | |
| 2007/0255635 A1 * | 11/2007 | Multer et al. | 705/36 R |
| 2008/0071655 A1 | 3/2008 | Carlson et al. | |
| 2008/0071679 A1 | 3/2008 | Foley | |
| 2008/0082369 A1 | 4/2008 | Carlson et al. | |
| 2008/0114703 A1 | 5/2008 | Dahlberg et al. | |
| 2008/0168007 A1 * | 7/2008 | Clark et al. | 705/36 R |
| 2008/0189218 A1 | 8/2008 | Herschler et al. | |
| 2008/0189219 A1 | 8/2008 | Herschler et al. | |
| 2008/0189220 A1 | 8/2008 | Herschler et al. | |

OTHER PUBLICATIONS

Herschler, Jacob; The Beauty of VAs Shines Through—Especially Today; National Underwriter; vol. 106, No. 40, p. 11 (Oct. 7, 2002).*

Lee, Hangsuck; Pricing Equity-Index Annuities with Path-Dependent Options; Insurance Mathematics and Economics, vol. 33, No. 3, pp. 677-690 (Dec. 19, 2003).*

I4 Life Advantage, "Lincoln ChoicePlus Variable Annuities with I4LIFE@ADVANTAGE and Optional Guaranteed Income Benefit," http://www.lfg.com/LincolnPageServer?LFGPage=/lfg/bdc/prd/ann/i41/index.html&KPage_Action=PRIN..., 2 pages, printed Jan. 25, 2005.

Manulife Financial, "Venture Combination Fixed and Variable Annuity," Financial Planning Resources, Inc., 4 pages, Jul. 1999.

Brochure, "Optional Retirement Program Overview," http://www6.ingretirementplans.com/SponsorExtranet/UTexas/YourPlanHighlights/10UtexasORPovervie..., ING North America Insurance Corporation, 3 pages, © 2002-2004 printed Jan. 25, 2005.

Brochure, "403(b) Tax Deferred Annuity (TDA) Overview," http://www6.ingretirementplans.com/SponsorExtranet/UTexas/YourPIarnHighlights/20UTexasTDA.html, ING North America Insurance Corporation, 3 pages, © 2002-2004 Printed Jan. 25, 2005.

Brochure, "ORP and TDA Payout Options," http://www6.ingretirementplans.com/SponsorExtranet/UTexas/YourPlanHighlights/30Utexas Payout.html, ING North America Insurance Corporation, 1 page, © 2002-2004 Printed Jan. 25, 2005.

Brochure, "TDA Fund Options," http://www6.ingretirementplans.com/SponsorExtranet/UTexas/AboutYourInvestrnents/20UTexasTDAfun..., ING North America Insurance Corporation, 4 pages, © 2002-2004 Printed Jan. 25, 2005.

White Paper, "Manulife Offers Payout Floor on Variables," Best's Review—Life-Health Insurance Edition, BestWire, 1 page, Jul. 20, 1998.

GSI, "Variable Annuity Account B of ING Life Ins & Annuity Co," 485BPOS, Aetna Life Insurance and Annuity Company Form N-4, www.gsionline.com, LIVEDGAR® Information Provided by Global Securities Information, Inc., 25 pages, as filed w/SEC on Nov. 24, 1999.

Peter C. Carlson, et al., "Financial Instrument Providing a Portable Guarantee," U.S. Appl. No. 11/531,872, pending, 60 pages, filed Sep. 14, 2006.

Mark J. Foley, "Financial Instrument Utilizing a Customer Specific Date," U.S. Appl. No. 11/531,948, pending, 58 pages, Filed Sep. 14, 2006.

Peter C. Carlson, et al., "Financial Instrument Utilizing an Optional Benefit Election," U.S. Appl. No. 11/531,977, pending, 54 pages, Filed Sep. 14, 2006.

Jacob M. Herschler et. al., "System and Method for Providing a Financial Instrument with an Asset Transfer Feature," U.S. Appl. No. 11/671,598, filed Feb. 6, 2007.

Jacob M. Herschler et. al., "System and Method for Providing a Financial Instrument Utilizing a Liability Ratio," U.S. Appl. No. 11/671,625, filed Feb. 6, 2007.

Jacob M. Herschler et. al., "System and Method for Providing a Financial Instrument with a Periodic Step-Up Feature," U.S. Appl. No. 11/671,679, filed Feb. 6, 2007.

State Farm Insurance, Like a good neighbor, State Farm is there, Future Income Plus, 3 pages.

Journal of Financial Planning, Article 6, A Stages Model for Planning Retirement Income Distribution, Michael D. Everett, et al., 10 pages, Jun. 2003.

Transamerica Life Insurance Company; Transamerica Announces New Liberty Flexible Premium Variable Annuity with 5 for Life Rider; 2005 Transamerica Capital, Inc.; 1 page, Jan. 24, 2005.

Jackson National Life Insurance Company; Variable Annuities; Perspective II; Features and Benefit Options Guide; VADV10871; pp. 1 to 25, Nov. 2004.

USAllianz High Five Variable Annuity Prospectus; A Flexible Payment Variable Annuity: Allianz Life Variable Account B; Allianz Life. The best at next, pp. 1 to 80, Apr. 29, 2005.

IL Annuity & Insurance Co Separate Account 1; 485BPOS IL Annuity and Insurance Form N-4 Post-Effective; File No. 033-089028; GSI; Livedgar Information Provided by Global Securities Information, Inc., pp. 1 to 99, Apr. 26, 1996.

Manufacturers Life Insurance Co USA Separate Account H; 485APOS; The Manufacturers Life Insurance Company; GSI; LIVEDGAR Information provided by Global Securities Information, Inc., pp. 1 to 161, Mar. 1, 1999.

Prospectus MetLife Investors Insurance Company; MetLife; Class Variable Annuities VA; May 1, 2005.

Brennan et al., "Time-Invariant Portfolio Insurance Strategies," The Journal of Finance, vol. 43, No. 2, 18 pages, Printed Mar. 15, 2007.

TSP Annuities, Jul. 2004, Federal Retirement Thrift Investment Board, 43 pages, Jul. 2004.

TSP Feature Chapter 1, www.archive.org, cited by Examiner in U.S. Appl. No. 11/531,872.

TSP Feature Chapter 2, www.archive.org, cited by Examiner in U.S. Appl. No. 11/531,872.

TSP Feature Chapter 13, www.archive.org, cited by Examiner in U.S. Appl. No. 11/531,872.

Herschler et al., USPTO, Notice of Office Communication, dated Dec. 1, 2008, U.S. Appl. No. 11/671,598, 20 pages, Dec. 1, 2008.

Carlson et al., USPTO, Notice of Office Communication, dated Oct. 14, 2008, U.S. Appl. No. 11/531,872, 25 pages, Oct. 14, 2008.

Carlson et al., USPTO, Notice of Office Communication, dated Apr. 10, 2009, U.S. Appl. No. 11/531,872, 43 pages, Apr. 10, 2009.

Foley, USPTO, Notice of Office Communication, dated Aug. 20, 2009, U.S. Appl. No. 11/531,948, 18 pages, Aug. 20, 2009.

Foley, USPTO, Notice of Office Communication, dated Apr. 2, 2009, U.S. Appl. No. 11/531,948, 15 pages, Apr. 2, 2009.

Foley, USPTO, Notice of Office Communication, dated Oct. 1, 2008, U.S. Appl. No. 11/531,948, 11 pages, Oct. 1, 2008.

Carlson et al., USPTO, Notice of Office Communication, dated Mar. 30, 2009, U.S. Appl. No. 11/531,977, 14 pages, Mar. 30, 2009.

Herschler et al, USPTO, Notice of Office Communication, dated Aug. 7, 2009, U.S. Appl. No. 11/671,625, 76 pages, Aug. 7, 2009.

Herschler et al, USPTO, Notice of Office Communication, dated Dec. 31, 2008, U.S. Appl. No. 11/671,625, 73 pages, Dec. 31, 2008.

Herschler et al, USPTO, Notice of Office Communication, dated Oct. 17, 2008, U.S. Appl. No. 11/671,679, 20 pages, Oct. 17, 2008.

Herschler et al, USPTO, Notice of Office Communication, dated May 8, 2009, U.S. Appl. No. 11/671,679, 29 pages, May 8, 2009.

Herschler et al, USPTO, Notice of Office Communication, dated Oct. 6, 2009, U.S. Appl. No. 11/671,679, 29 pages, Oct. 6, 2009.

* cited by examiner

FINANCIAL INSTRUMENT PROVIDING A GUARANTEED GROWTH RATE AND A GUARANTEE OF LIFETIME PAYMENTS

RELATED APPLICATION

This application claims the benefit under 35 U.S.C. §119 of U.S. Provisional Application Ser. No. 60/703,630 filed Jul. 29, 2005.

TECHNICAL FIELD OF THE INVENTION

This invention relates generally to financial instruments and more particularly to a financial instrument providing a guaranteed growth rate and a guarantee of lifetime payments.

BACKGROUND OF THE INVENTION

There are numerous financial instruments available on the market and people invest in them for a variety of reasons. Some investors are interested in obtaining high rates of return on their investments, while others are willing to forego high rates of return in exchange for a reduced level of financial risk. Some investors are interested in obtaining a steady income stream for a period of years or possibly for life. When making decisions regarding the selection of a financial instrument, there are multiple tradeoffs. Typically, the lower the risk is, the lower the expected rate of return will be. There are also numerous tax consequences that may be considered in selecting a financial instrument.

An annuity is one form of financial instrument. A typical annuity is used to pay a certain sum of money at specified intervals, with the payment amount being based on a given amount of principal. There are many different types of annuities. For example, annuities can be immediate or deferred, fixed or variable, and single payment or multiple payment.

In a typical immediate annuity, a lump sum of money is exchanged for a stream of payments to begin immediately. In a typical deferred annuity, an investment is made with the anticipation that it will grow and a stream of payments based upon the value of the account at a future time will begin at some point in the future. A fixed annuity is one in which the rate of return is specified at the time the annuity is purchased. A variable annuity typically allows the purchaser to select from a group of potential investments and the rate of return depends upon the performance of the selected investments.

In some cases, annuities provide additional benefits such as death benefits, cash surrender benefits, or joint and survivor income payment options.

SUMMARY OF THE INVENTION

According to one embodiment of the invention, a method for providing a financial instrument includes determining an initial account balance associated with a financial instrument based upon an initial deposit amount, wherein the financial instrument includes an account with an account balance that changes over time and allows at least part of an account balance to be discretionarily withdrawn. The method further includes establishing a first guarantee of a protected value, the protected value including at least an amount based upon the initial account balance growing at a minimum positive growth rate for at least a defined period of time or until one or more defined events occur, whichever is sooner; and establishing a second guarantee that a beneficiary may periodically receive a transfer of an amount of money for the life of a designated party, wherein the amount comprises a percentage of the protected value at the time of a particular event, wherein the percentage of the protected value is fixed upon an effective date of the second guarantee, and wherein the transfer may be due to withdrawal from the account or due to benefit payments made to the beneficiary, provided that the amount may vary based upon withdrawals from the account in excess of a first particular limit. The method further providing that at least one of the above actions is performed using a computer.

Certain embodiments of the present invention may provide various technical advantages. For example, the invention may allow an account holder to maintain liquidity in an account while at the same time receiving a guarantee of lifetime income and a guaranteed growth rate. Certain embodiments may also allow an account holder to receive the potentially higher rates of return associated with variable annuities while at the same time avoiding the associated risk of loss by obtaining a guaranteed growth rate.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE EXAMPLE EMBODIMENTS

It should be understood at the outset that although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
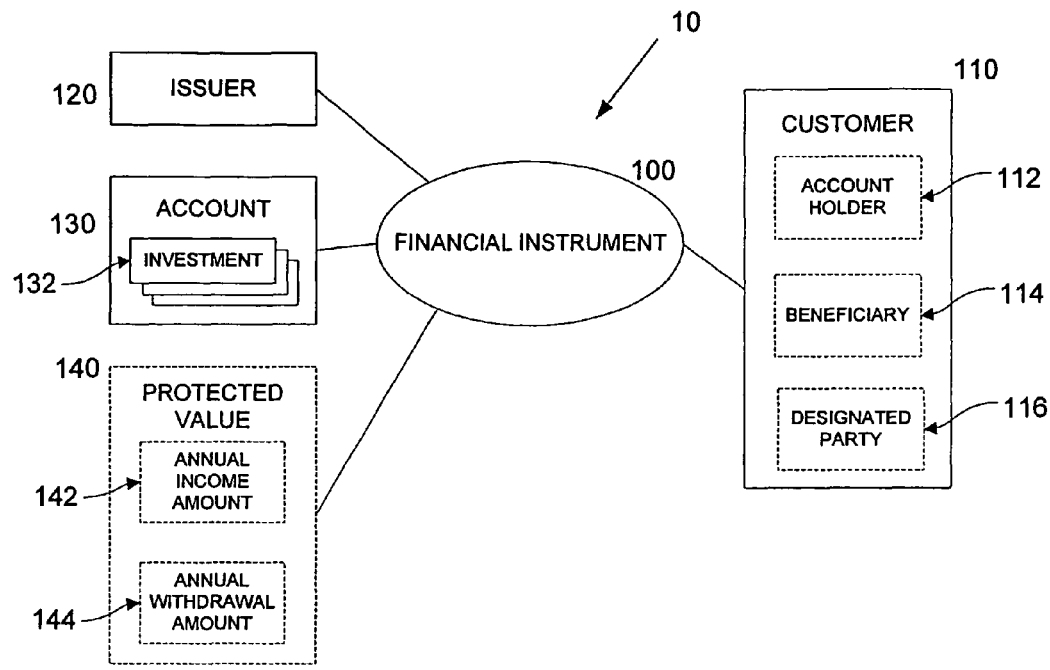
FIG. 1 illustrates a system for providing a financial instrument according to a particular embodiment of the present invention.

FIG. 1 illustrates a system 10 for providing financial instrument 100 according to a particular embodiment of the present invention. System 10 may interact with customer 110 and issuer 120; and system 10 may utilize account 130 and protected value 140. Financial instrument 100 may represent a contract between customer 110 and issuer 120. Financial instrument 100 may include certain provisions as described below in relation to FIG. 2.

According to certain embodiments, system 10 may be utilized to provide financial instrument 100 to customer 110, such that customer 110 may make a deposit and retain liquidity, while also receiving the benefit of a guarantee of lifetime payments and the security associated with a guaranteed growth rate.

Customer 110 may broadly refer to one or more of an account holder 112, a beneficiary 114, a designated party 116, and/or one who purchases financial instrument 100 for another person or entity. In certain embodiments, account holder 112 may represent a party who purchases financial instrument 100 and/or who is attributed as being an owner of account 130. In certain embodiments, account holder 112 may have one or more ownership rights in account 130. For example, account holder 112 may have the right to terminate financial instrument 100, to make investment decisions for account 130, to identify one or more beneficiaries 114, and/or to identify one or more designated parties 116, to make deposits into account 130. In a particular embodiment, account holder 112 may be the entity or entities who have tax liability for the transactions related to account 130. In certain embodiments, beneficiary 114 may represent a party who may receive payments and/or make withdrawals in accordance with the terms of financial instrument 100. In certain embodiments, designated party 116 may represent an individual, group of individuals, and/or other entity that may be designated for purposes of determining death benefits, lifetime payments, fees, guaranteed rates, and/or other features of financial instrument 100. For example, guaranteed rates and/or fees may be determined based upon the age, gender, and/or health of designated party 116. As another example, death benefit provisions may be based upon the death of designated party 116.

In certain embodiments, one or more of account holder 112, beneficiary 114, and designated party 116 may be the same party. In certain embodiments, financial instrument 100 may be purchased by account holder 112 for the benefit of beneficiary 114, with designated party 116 being the designated life for the guarantee of lifetime payments.

In certain embodiments, one or more of account holder 112, beneficiary 114, and designated party 116 may be related. For example, designated party 116 and beneficiary 114 may be related as husband and wife. As another example, account holder 112 may be an employer and an employee may be both beneficiary 114 and designated party 116. Alternatively, account holder 112 and beneficiary 114 may be the same individual or entity. In some embodiments, an employer might purchase account 130 for account holder 112. Also, financial instrument 100 may have multiple account holders 112, beneficiaries 114, and/or designated parties 116. For example, a husband and a wife may both be beneficiaries 114 and designated parties 116. As another example, two or more business partners could be designated parties 116. While this patent describes various actions, benefits, steps, etc. in relation to a customer 110, account holder 112, beneficiary 114, and/or designated party 116, those descriptions should not be construed as limiting because financial instrument 100 might provide for various persons to exercise control, take various actions, receive certain benefits, and/or affect certain features with regard to financial instrument 100.

Issuer 120 may represent an entity that provides and/or sells financial instrument 100 to customer 110. Issuer 120 may represent a bank, an insurance company, or other business entity engaged in the sale of one or more financial instruments. Issuer 120 may also represent multiple entities that operate together to provide or sell financial instrument 100.

Account 130 may represent a principal balance including amounts deposited by customer 110 together with accrued growth due to a return on one or more investments. The value of account 130 may be distributed among one or more investments 132. Investment 132 may provide a fixed or variable return, and the value of account 130 may be distributed among any combination of investments 132. For example, investment 132 may represent a municipal bond, a bond fund, a money market account, a corporate security, an index fund, a mutual fund, a real estate investment trust, or any other appropriate type of investment. In certain embodiments, account 130 may include one or more investments 132 associated with multiple financial entities. In certain embodiments, the value of account 130 may be withdrawn in whole or in part at the discretion of customer 110. In various embodiments, issuer 120 may restrict the kinds of investments 132 available to customer 110 or allow customer 110 to accept certain limitations in exchange for other benefits. Account 130 may or may not be associated with issuer 120. In some embodiments, a third party administering account 130 may contract with issuer 120 to provide the guarantees. An insurance company, for example, might provide the guarantees for mutual fund accounts administered by a third party or for other types of financial accounts.

Protected value 140 represents a value all or a portion of which issuer 120 guarantees that beneficiary 114 will be able to receive. Protected value 140 may be based upon the value of account 130 at some point in time. In some embodiments, although account 130 may decrease due to market fluctuations, protected value 140 does not, thus providing a guaranteed rate of return regardless of market performance. In certain embodiments, protected value 140 may be based upon an initial deposit and the initial deposit may include an account balance from an existing contract. Thus, in some embodiments, the guarantees described herein may be added to existing financial instruments after the passage of time.

In certain embodiments, the amount and/or the guaranteed percentage of protected value 140 may vary based on certain characteristics of customer 110. For example, the guaranteed percentage of protected value 140 (or the protected value 140 itself) may vary based upon the gender, age, or health status of one or more of account holder 112, beneficiary 114, and designated party 116. In certain embodiments, the amount and/or the guaranteed percentage of protected value 140 may vary depending upon whether and to what extent customer 110 accepts certain limitations on flexibility and/or control over account 130 and/or distributions therefrom. The amount available for withdrawal may also vary similarly.

In certain embodiments, protected value 140 may be calculated at the time that financial instrument 100 is purchased, and in other embodiments protected value 140 may be calculated at the end of a certain period of time or upon the happening of a triggering event. In some embodiments, protected value 140 may be based upon a combination of factors and calculated at different times. Depending upon the embodiment, protected value 140 may become fixed at some point in time. For example, protected value 140 may become fixed at the time of the first discretionary withdrawal from account 130 by customer 110.

Numerous methods may be used to fix protected value 140 at some point in time. For example, protected value 140 may be calculated as equal to the value of account 130 at the time of the first withdrawal by customer 110. Alternatively, protected value 140 may be calculated as the highest value of account 130 at one or more specified times or at any time. For example, protected value 140 may be calculated as the highest value of account 130 on each of the first ten anniversaries of the purchase date. In certain embodiments, protected value may be calculated as the greater of multiple calculation methods. For example, protected value may be calculated as the value of account 130 on the date of first withdrawal or the highest value of account 130 on the first ten anniversary dates, but in no event less than the initial value of account 130 growing at a five percent growth rate for the first ten years. In certain embodiments, protected value 140 may be calculated based upon the value of account 130 prior to the inclusion of any bonuses. Alternatively, in certain embodiments, protected value 140 may be calculated based upon the value of account value 130 with additional bonuses (or other incentives) added. For example, issuer 120 may pay a bonus to entice customers to purchase the guarantees discussed herein. The invention may include any method of determining protected value 140.

In certain embodiments, the amount and/or the guaranteed percentage of protected value 140 may change after it has been initially determined. As one example, the amount and/or guaranteed percentage of protected value 140 may change based upon changes in the law. As another example, the amount and/or guaranteed percentage of protected value 140 may change based upon an inflationary index, interest rate, or exchange rate. As yet another example, the amount and/or guaranteed percentage of protected value 140 may change based upon changes in the health of customer 110.

In certain embodiments, customer 110 may be allowed to step-up protected value 140 at specified times or at any time. For example, following an election to step-up protected value 140, protected value 140 may be set as equal to the current value of account 130. In a particular embodiment, customer 110 may elect to step-up protected value 140 at any time after the fifth anniversary of the first withdrawal, with additional step-ups being available five years after the date of the previous step-up election. A step-up in protected value 140 may require further deposits to account 130.

In certain embodiments, certain provisions of financial instrument 100 may be managed through the use of annual income amount 142 and/or annual withdrawal amount 144. For example, a guarantee of lifetime payments may be managed by calculating annual income amount 142 and evaluating discretionary withdrawals in relation to annual income amount 142. For example if the cumulative withdrawals for a certain year exceed annual income amount 142, then annual income amount 142 may be reduced accordingly for future years. Similarly, one or more guarantees may be managed by calculating annual withdrawal amount 144 and evaluating discretionary withdrawals in relation to annual withdrawal amount 144. Further explanation of the operation of a certain embodiment with respect to protected value 140, annual income amount 142, and annual withdrawal amount 144 is included below in relation to FIGS. 3A and 3B.

In the operation of certain embodiments, customer 110 may purchase financial instrument 100 from issuer 120 (or an agent thereof). In some cases, the purchase may occur electronically. Issuer 120 may then create account 130 and associate one or more deposits made by customer 110 with account 130. In certain embodiments, customer 110 may make investment choices regarding the allocation of funds associated with account 130. Protected value 140 may be calculated using one or more specified calculation methods.

In some embodiments, following the purchase of financial instrument 100, customer 110 may make additional deposits to and/or discretionary withdrawals from account 130. Withdrawals from account 130 may or may not be required or allowed based upon the terms of financial instrument 100. The timing of withdrawals may or may not be regulated by financial instrument 100. In certain embodiments, withdrawals can be taken as separate partial withdrawals or as systematic withdrawals. For example, withdrawals may be automated and may be set up on a periodic basis, with the period being yearly, quarterly, monthly, etc.

Although financial instrument 100 has been described as being purchased directly from issuer 120 in certain embodiments, financial instrument 100 may be purchased through one or more intermediaries.

Figure 2:
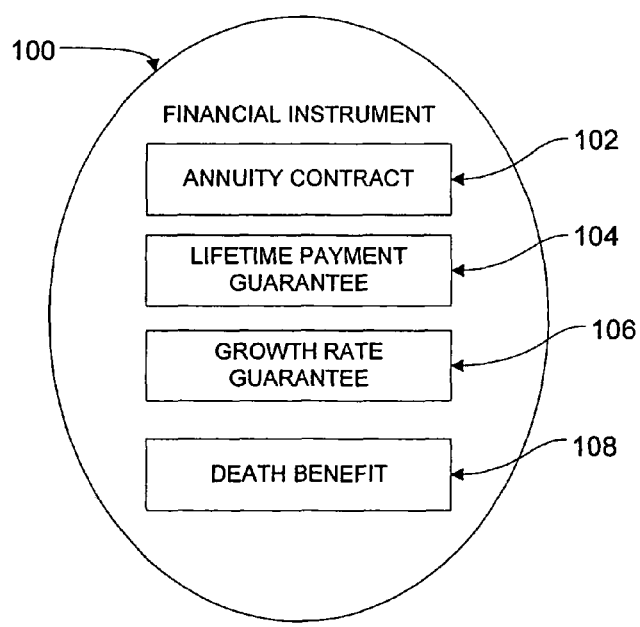
FIG. 2 illustrates a financial instrument according to a particular embodiment.

FIG. 2 illustrates a particular embodiment of financial instrument 100. In the embodiment shown, financial instrument 100 includes annuity contract 102, lifetime payment guarantee 104, growth rate guarantee 106, and death benefit 108. Annuity contract 102 may represent a contract for a broad range of annuity products. For example, annuity contract 102 may represent a deferred variable annuity such as ANNUITY ONE 3 issued by PRUCO LIFE INSURANCE COMPANY. In certain embodiments, annuity contract 102 may represent a contract between customer 110 and issuer 120, wherein customer 110 may make deposits and/or withdrawals during an accrual phase and then issuer 120 may make payments during a distribution phase. The transition from the accrual phase to the distribution phase may occur following an election by customer 110 to annuitize account 130.

In addition to the basic terms of annuity contract 102, financial instrument 100 may include additional provisions including lifetime payment guarantee 104, growth rate guarantee 106, and death benefit 108. Although annuity contract 102, lifetime payment guarantee 104, growth rate guarantee 106, and death benefit 108 are shown as separate elements, one or more of these elements may be combined, and each of these elements may also include numerous components. In certain embodiments, different elements of financial instrument 100 may be purchased or elected at different times. For example, annuity contract 102 may be purchased in year one, and lifetime payment guarantee 104 and growth rate guarantee 106 may be purchased or elected in year one or at anytime thereafter. In some embodiments, account 130 remains liquid and may be withdrawn (in some cases with penalty) by customer 110 prior to annuitization of annuity contract 102. Annuitization may or may not even occur upon the desires of customer 110.

In certain embodiments, lifetime payment guarantee 104 may include provisions guaranteeing that beneficiary 114 may receive financial transfers for life, beginning at or after a specified triggering event. For example, in certain embodiments, these financial transfers may be due to discretionary withdrawals and/or payments. In certain embodiments, the amount of (and/or a limit for) these financial transfers may be fixed or variable. For example, the amount of (and/or a limit for) these financial transfers may be determined based upon the age, gender, health status, and/or other morbidity factors for one or more individuals. As another example, the amount of (and/or a limit for) these financial transfers may be independent of such factors. In certain embodiments, the amount of (and/or the limit for) these financial transfers may change after a period of time according to a set schedule, changes in an external index, and/or any appropriate factor.

In certain embodiments, the amount of (and/or a limit for) these financial transfers may be determined based upon specified percentages of protected value 140. For example, the amount of (and/or a limit for) these financial transfers may be set at a first percentage for a certain period and then change to second percentage for another period. In certain embodiments, these percentages may be fixed upon the effective date of lifetime payment guarantee 104, upon the date of a first financial transfer, or upon any other appropriate date.

In certain embodiments, lifetime payment guarantee 104 may guarantee that beneficiary 114 will receive no less than annual income amount 142 each year for the life of designated party 116, beginning with an event. In certain embodiments, annual income amount 142 may be five percent of protected value 140, but any percentage of any measured amount could be used. In certain embodiments, protected value 140 may be adjusted upwards or downwards based on certain events. For example, protected value 140 may be increased by additional deposits and may be decreased by cumulative withdrawals in a single year that exceed annual income amount 142.

In certain embodiments, growth rate guarantee 106 may include provisions allowing customer 110 to make withdrawals from account 130 based upon deposits made by customer 110. The provisions may further provide that the withdrawals may be made from a value that is guaranteed to grow at a specified fixed or variable rate for a specified period of time. For example, growth rate guarantee 106 may allow beneficiary 114 to make withdrawals from protected value 140, with protected value 140 guaranteed to be no less than the value of customer deposits growing at a fixed five percent per year for ten years from the date of the first deposit or until the date of the first withdrawal, whichever is sooner.

In certain embodiments, the specified rate for growth rate guarantee 106 may be any positive fixed value. In certain embodiments, the specified rate for growth rate guarantee 106 may be zero or a fixed negative value. In embodiments where the specified rate is zero or a fixed negative value, the beneficial aspects of growth rate guarantee 106 may include a reduction in risk for customer 110. In certain embodiments, the specified rate may be based on one or more variable indices. For example, the specified rate may be based on the Consumer Price Index, a stock market index, and/or the Federal Reserve's discount rate.

In certain embodiments, the specified rate may vary depending on the timing of deposits, the size of deposits, and/or the value of investments 132. For example, different rates may apply to different deposits or the overall rate may be calculated based on the rates in effect at the time that deposits are made, weighted based on the relative size (or actual size) of the deposits. In certain embodiments, the specified rate may vary based on characteristics of account holder 112, beneficiary 114, and/or designated party 116. For example, the specified rate may vary depending on the gender, age, or health status of designated party 116.

In certain embodiments, the guaranteed growth may be set at a first rate for a specified period of time, or until a specified event occurs, and then change to a second rate. For example, the guaranteed growth rate may be zero for the first two years and then may change to a fixed five percent growth rate for the next eight years. In certain embodiments, the growth rate may change numerous times, with the changes occurring based upon specified periods of time and/or upon the occurrence of specified events.

In embodiments of financial instrument 100 including death benefit 108, death benefit 108 may include provisions allowing for payments to be made to a recipient designated by account holder 112 and/or beneficiary 114, upon the death of designated party 116. For example, payments made under death benefit 108 may be made to beneficiary 114 upon the death of designated party 116, where designated party 116 is account holder 112. As another example, payments made under death benefit 108 may be made to an identified third party beneficiary upon the death of designated party 116 or beneficiary 114. Death benefit 108 may provide for payment of an amount based upon the value of account 130, protected value 140, or some other value identified in death benefit 108. For example, death benefit 108 may provide for payment in the amount of the value of account 130 at the time of death. As another example, death benefit 108 may provide for payment in the amount of the highest value of account 130 on any anniversary of the effective date of financial instrument 100. In certain embodiments, death benefit 108 may provide for payment in the amount of the highest of multiple calculation methods. Although death benefit 108 has been illustrated and described as a separate element of financial instrument 100, death benefit 108 may be formed from multiple components and/or may be included as part of another element of financial instrument 100.

In embodiments of financial instrument 100 including annuity contract 102, lifetime payment guarantee 104, and growth rate guarantee 106, annuitization may occur due to an election to annuitize or the terms of annuity contract 102 may require annuitization on or before a certain date or triggering event. In certain embodiments, upon annuitization, customer 110 may be provided with multiple annuitization options. For example, customer 110 may be provided with periodic payments for life, with the amount of the payments based in part upon the value of account 130 at the time of annuitization. As another example, customer 110 may be provided with periodic payments for an established period, with the amount of the payments based in part upon the value of account 130. Alternatively, customer 110 may be provided with periodic payments for life in an amount equivalent to annual income amount 142 or customer 110 may be provided with periodic payments in an amount equivalent to the annual withdrawal amount 144 for a period of time extending until protected value 140 is exhausted. In certain embodiments, upon annuitization, the benefits associated with lifetime payment guarantee 104 and growth rate guarantee 106 may be terminated.

In certain embodiments, financial instrument 100 may provide for an option allowing customer 110 to elect to receive the present value of future guaranteed payments. For example, in embodiments where the charge for lifetime payment guarantee 104 is an up-front charge, financial instrument 100 may allow for customer 110 to cancel lifetime payment guarantee 104 and receive a payment calculated based upon the present value of the guarantee. In these embodiments, the calculation may or may not include an underwriting assessment of the life expectancy of beneficiary 114.

Although, in the embodiment shown, financial instrument 100 includes annuity contract 102, in other embodiments financial instrument 100 may include any other appropriate forms of investment contracts. For example, financial instrument 100 may include a mutual fund contract, a 401(k) contract, and/or an individual retirement account contract in addition to, or in lieu of, annuity contract 102.

The costs associated with each element of financial instrument 100 may be assessed together or as separate charges, and the charges may be assessed in different ways. For example, the costs may be assessed as up-front charges, as asset charges, or as charges against withdrawals or payments. In certain embodiments, the costs may be charged periodically and/or may vary over time. For example, there may be no charge for a period of time and/or the charge may increase or decrease over time depending on a variety of factors. In certain embodiments, the costs may be charged in a manner such that the charge is assessed pro-rata over multiple investments or accounts 130, according to an election by customer 110, and/or such that the tax consequences of the charge are substantially minimized. In a particular embodiment, the charge for each element is assessed as a daily asset charge against the value of account 130. For example, the charge assessed for lifetime payment guarantee 104 and growth rate guarantee 106 may be a sixty basis point charge (0.60 percent per year)

assessed against the daily balance of account 130. Similarly, the charge assessed for death benefit 108 may be a 140 basis point charge (1.40 percent per year) assessed against the daily balance of account 130.

As indicated above, in certain embodiments, financial instrument 100 may provide for multiple beneficiaries 114 and financial instrument 100 may provide for various persons to exercise control. For example, financial instrument 100 may provide that both a husband and a wife are beneficiaries 114 and designated parties 116. Financial instrument 100 may further provide that the husband may make discretionary withdrawals from account 130 and, if the husband pre-deceases the wife, that the wife may make discretionary withdrawals from account 130 after the husband's death. Additionally, financial instrument 100 may further provide that if account value 130 reaches zero during the husband's life, then the husband may receive periodic payments for life and then, upon his death, the wife may receive periodic payments for her life. In certain embodiments, financial instrument 100 may include similar provisions for business partners or other arrangements involving multiple beneficiaries 114 and/or designated parties 116.

Figure 3A:
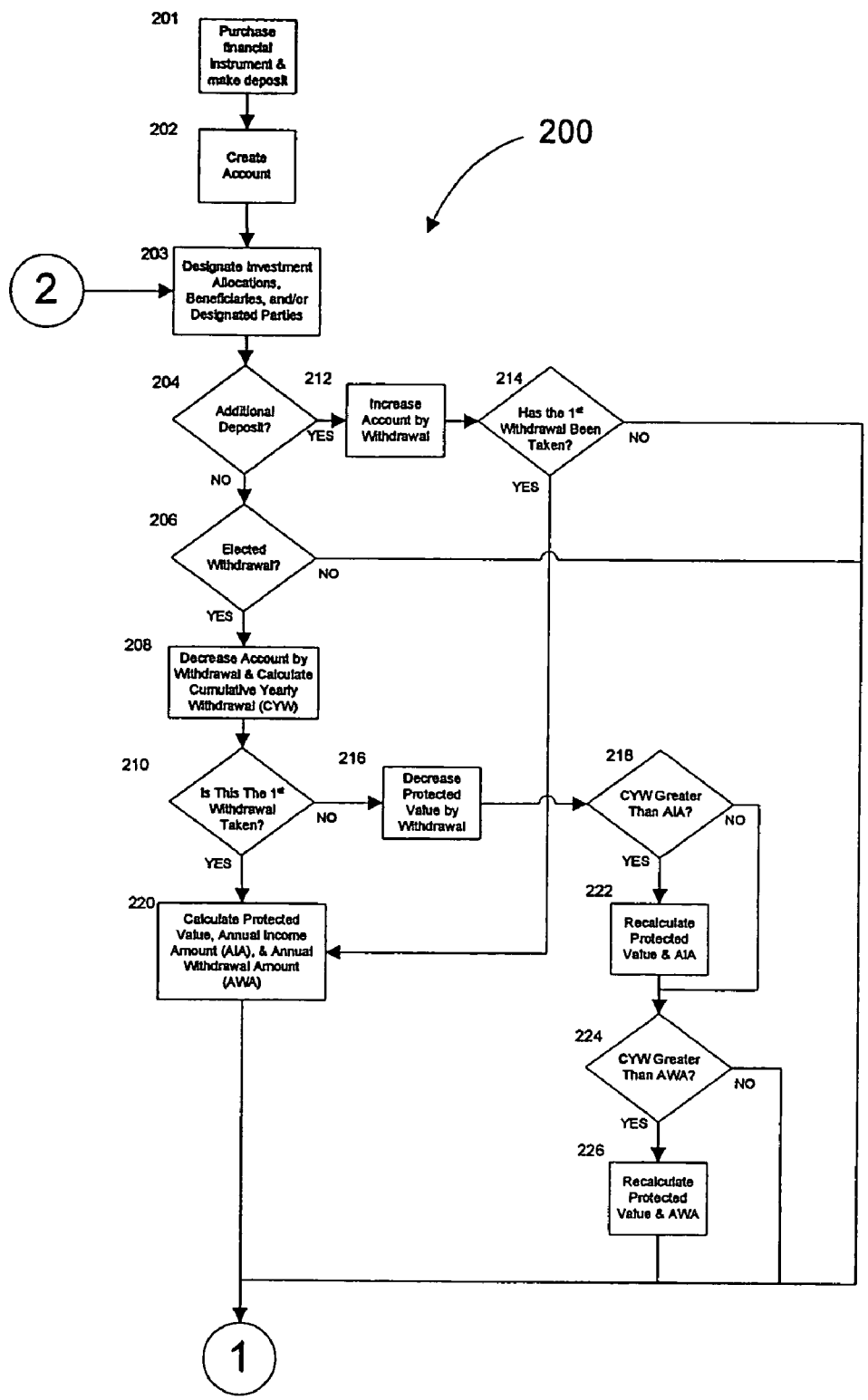
FIGS. 3A and 3B provide a flowchart illustrating the operation of a financial instrument according to a particular embodiment.
Figure 3B:
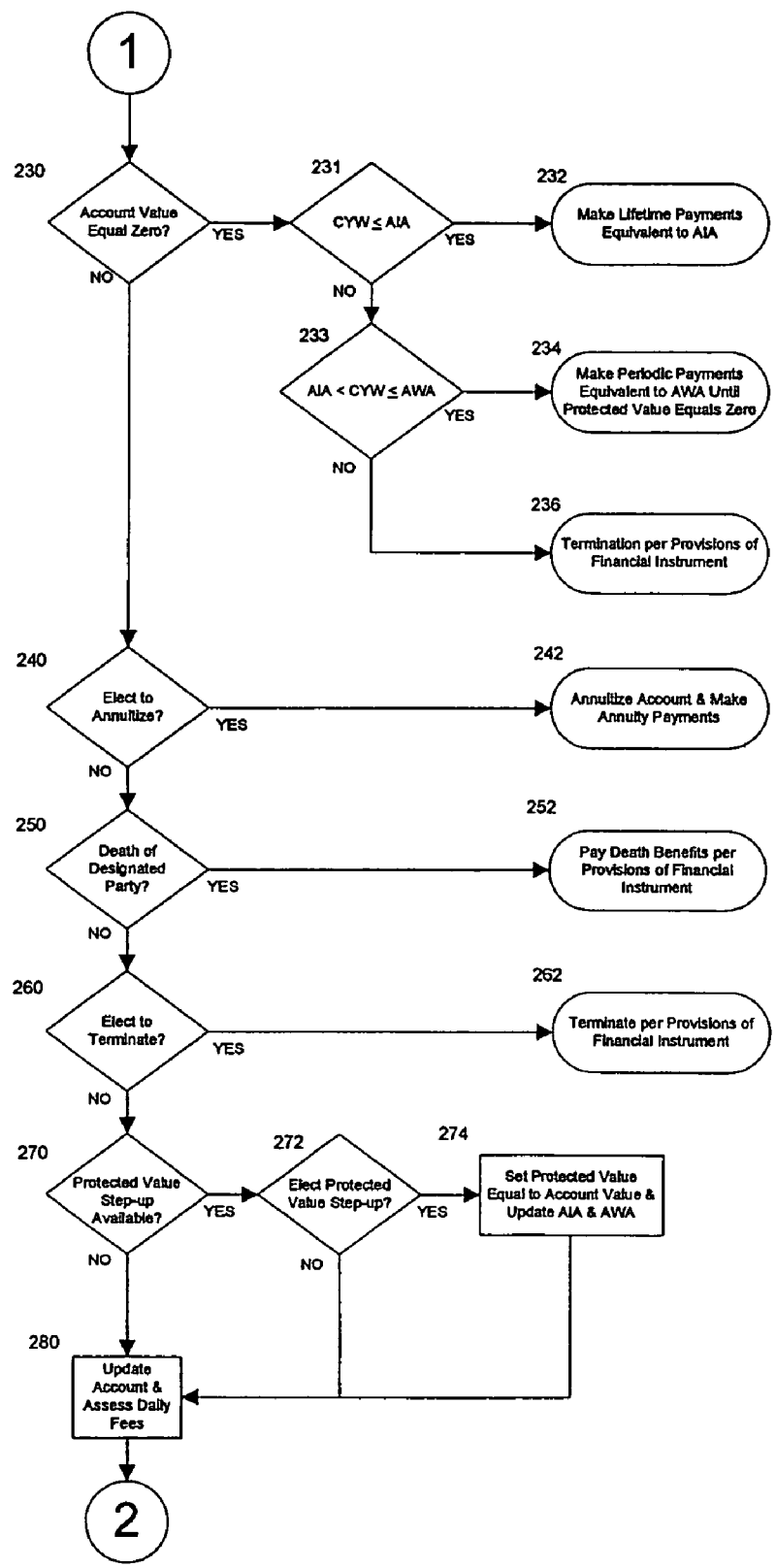

FIGS. 3A and 3B provide flowchart 200 which illustrates the operation of financial instrument 100 according to a particular embodiment. Flowchart 200 traces a few of the possible scenarios that are available to customer 110 following the purchase of financial instrument 100. Flowchart 200 is intended to demonstrate an embodiment of financial instrument 100 in which certain features of financial instrument 100 are paid for on a daily basis through the use of a daily fee assessment, assessed on a daily basis against the value of account 130. Accordingly, although in certain embodiments more than one of the elected actions identified in flowchart 200 may be taken on the same day, flowchart 200 assumes that only one elected action will be taken for any given day.

According to flowchart 200, at step 201, customer 110 may make one or more initial deposits and purchase financial instrument 100, including lifetime payment guarantee 104 and growth rate guarantee 106. At step 202, account 130 is created. Customer 110 may designate investment allocations for account 130, one or more beneficiaries 114, and/or one or more designated parties 116, at step 203. If additional deposits are made by customer 110, at step 204, then the value of account 130 is increased by the amount of the additional deposits, at step 212. In some cases, a fee may be deducted from the additional deposits. If an elected withdrawal is taken at step 206, then the value of account 130 is decreased by the amount of the withdrawal and the cumulative yearly withdrawal is calculated at step 208. If the withdrawal is the first withdrawal taken in relation to financial instrument 100, at step 210, then protected value 140, annual income amount 142, and annual withdrawal amount 144 are calculated at step 220. Similarly, if additional deposits are made by customer 110 at step 204 and the first withdrawal has already been taken at step 214, then protected withdrawal 140, annual income amount 142, and annual withdrawal amount 144 are calculated at step 220. In some embodiments, the additional deposits may not change some or all of these values. If the withdrawal is not the first withdrawal taken in relation to financial instrument 100, at step 210, then protected value 140 is decreased by the amount of the withdrawal at step 216. If the cumulative yearly withdrawal exceeds annual income amount 142, at step 218, then protected value 140 and annual income amount 142 are recalculated at step 222. If the cumulative yearly withdrawal exceeds annual withdrawal amount 144, at step 224, then protected value 140 and annual withdrawal amount 144 are recalculated at step 226. These and other calculations are discussed in more detail below.

If the value of account 130 is equal to zero, at step 230, then there may be multiple possible alternative outcomes. If the value of account 130 is equal to zero at step 230 and cumulative yearly withdrawals are less than or equal to annual income amount 142 at step 231, then lifetime benefit payments may be made to customer 110 in an amount equivalent to annual income amount 142, at step 232. If the value of account 130 is equal to zero at step 230 and cumulative yearly withdrawals are greater than annual income amount 142 but less than or equal to annual withdrawal amount 144 at step 233, then beneficiary 114 may have withdrawals in an amount equivalent to annual withdrawal amount 144 until protected value 140 equals zero, at step 234. If the value of account 130 is equal to zero at step 230 and cumulative yearly withdrawals are greater than annual withdrawal amount 144, then financial instrument 100 may be terminated in accordance with the provisions of financial instrument 100, at step 236.

If financial instrument 100 includes annuity contract 102 and customer 110 elects to annuitize, at step 240, then account 130 is annuitized and annuity payments are made pursuant to the provisions of annuity contract 102, at step 242. Account 130 may cease to exist at this point and its balance may no longer be able to be withdrawn by customer 110. If financial instrument 100 includes death benefit 108 and if customer 110 dies, at step 250, then payments are made pursuant to the provisions of death benefit 108, at step 252. If customer 110 elects to terminate one or more provisions of financial instrument 100, at step 260, then those provisions are terminated in accordance with the terms of financial instrument 100, at step 262.

If a step-up for protected value 140 is available at step 270 and if customer 110 elects a step-up for protected value 140 at step 272, then protected value 140 is set as equal to the current value of account 130 and annual income amount 142 and annual withdrawal amount 144 are updated, at step 274. In some embodiments, step 272 may be omitted and the step up may be automatic. Account 130 may be updated to reflect daily changes in investments 132 and daily fees may be assessed against account 130, at step 280.

The calculations identified in flowchart 200 are dependent upon the particular features of financial instrument 100. Included below are example calculations for particular embodiments of financial instrument 100. In the example calculations described below, financial instrument 100 is treated as including annuity contract 102, lifetime payment guarantee 104, and growth rate guarantee 106. For the purpose of these calculations, annuity contract 102 is treated as a deferred variable annuity, growth rate guarantee 106 is treated as a guarantee of a five percent growth rate for the first ten years, and lifetime payment guarantee 104 is treated as a guarantee of five percent payments for life. Unless otherwise indicated, it will be assumed that financial instrument 100 was purchased with an initial deposit and no additional deposits have been made. Also, unless indicated otherwise, all interest is assumed to be compounded daily.

Each time that a withdrawal is made, the value of account 130 may be reduced by the amount of the withdrawal. In one embodiment, on the date of the first withdrawal, protected value 140 may be set at the greater of the current value of account 130 or the initial value of account 130 growing at five percent per year compounded. Using these assumptions, on the date of the first withdrawal, annual income amount 142 may set at five percent of protected value 140 at the time that protected value 140 is initially determined. Similarly, annual withdrawal amount 144 may be set at seven percent of protected value 140 at the time that protected value 140 is initially determined. In particular embodiments, the percentages and/or methods of determining annual withdrawal amount 144 or annual income amount 142 may vary.

For example, suppose an initial deposit of $100,000 is made on Apr. 1, 2005. The first withdrawal takes place on Feb. 1, 2006 when the value of account 130 is equal to $102,500. Protected value 140 would initially be calculated as the greater of $102,500 or $104,175.16.

$100,000 \times (1.05)^{(306/365)} = \$104,175$

Thus, protected value 140 would be $104,175. After the initial protected value 140 is calculated, the withdrawal amount may be subtracted from account 130 and protected value 140. Accordingly, based on the assumptions above, annual income amount 142 would initially be $5,208.75.

$104,175 \times 0.05 = \$5,208.75$

Similarly, annual withdrawal amount 144 would initially be $7,292.25.

$104,175 \times 0.07 = \$7,292.25$

If the cumulative withdrawals in a given year exceed annual income amount 142, protected value 140 and annual income amount 142 are recalculated. Suppose that the current value of account 130 is $55,000 and annual income amount 142 is $5,000. The first withdrawal during the applicable year is $7,000, which is $2,000 greater than annual income amount 142. The first step in the calculation would be to subtract annual income amount 142 from the current value of account 130. Thus, the value of account 130 would be reduced to $50,000. ($55,000−$5,000=$50,000) The next step is to calculate the new annual income amount 142. Annual income amount 142 would decrease according to the percentage of the excess amount to the value of account 130 prior to the excess being deducted. Thus, annual income amount 142 would drop to $4,800 for subsequent years.

$(1-(\$2,000/\$50,000)) \times \$5,000 = \$4,800$

The excess withdrawal amount would then be subtracted from the value of account 130. Thus, after the withdrawal, the value of account 130 would be $48,000. Protected value 140 would similarly be reduced by the amount of the $7,000 withdrawal.

If the cumulative withdrawals in a given year exceed annual withdrawal amount 144, protected value 140 and annual withdrawal amount 144 are recalculated. Suppose that the current value of account 130 is $58,000 and annual withdrawal amount 144 is $8,000. The first withdrawal during the applicable year is $12,000, which is $4,000 greater than annual withdrawal amount 144. The first step in the calculation would be to subtract annual withdrawal amount 144 from the current value of account 130. Thus, the value of account 130 would be reduced to $50,000. ($58,000−$8,000=$50,000) The next step is to calculate the new annual withdrawal amount 144. Annual withdrawal amount 144 would decrease according to the percentage of the excess amount to the value of account 130 prior to the excess being deducted. Thus, annual withdrawal amount 144 would drop to $7,360 for subsequent years.

$(1-(\$4,000/\$50,000)) \times \$8,000 = \$7,360$

The excess withdrawal amount would then be subtracted from the value of account 130. Thus, after the withdrawal, the value of account 130 would be $46,000. Protected value 140 would similarly be reduced by the amount of the $12,000 withdrawal.

In certain embodiments, withdrawals that reduce the value of account 130 below a specified minimum amount will not be allowed if they are greater than the annual income amount. In certain embodiments, provisions in financial instrument 100 may allow for exceptions to accommodate certain provisions of the tax code. For example, if financial instrument 100 is subject to required minimum distributions under the tax code, then financial instrument 100 may provide that required withdrawals will not reduce annual income amount 142.

Each time that an additional deposit is made, the value of account 130 may be increased by the amount of the deposit. If a withdrawal has been made prior to the additional deposit, then protected value 140 may also be increased by the amount of the additional deposit, annual income amount 142 may be increased by five percent of the additional deposit, and annual withdrawal amount 144 may be increased by seven percent of the additional deposit. For example, suppose protected value 140 is $50,000, annual withdrawal amount 144 is $7,000, and annual income amount is $5,000. If customer 110 makes an additional deposit of $42,400, then protected value 140 would increase to $92,400. ($50,000+$42,400=$92,400). Annual withdrawal amount 144 would increase to $9,968.

$(\$42,400 \times 0.07) + \$7,000 = \$9,968$

Annual income amount 142 would increase to $7,120.

$(\$42,400 \times 0.05) + \$5,000 = \$7,120$

Again, the percentages may vary and the ability to make deposits may be controlled. Some contracts may have annual withdrawal amount 144 only or annual income amount 142 only.

If financial instrument 100 provides for step-ups to protected value 140, during periods when step-ups are allowed customer 110 may elect to step-up protected value 140 to equal the value of account 130 (or some proportional amount). In some cases, the step-up may be automatic. If such a step-up is elected, annual income amount 142 may be set at the greater of its current value or five percent of the new protected value 140. Similarly, if such a step-up is elected, annual withdrawal amount 144 may be set at the greater of its current value or seven percent of the new protected value 140. For example, suppose the value of account 130 is $80,000, protected value 140 is $60,000, annual withdrawal amount 144 is $7,000, and annual income amount 142 is $3,500. If a step-up is elected, protected value 140 would be set at $80,000, and annual income amount 142 would be set at $4,000. ($80,000×0.05=$4,000). Annual withdrawal amount 144 would remain the same, because seven percent of protected value 140 ($80,000×0.07=$5,600) is less than annual withdrawal amount 144 ($7,000).

Figure 4A:
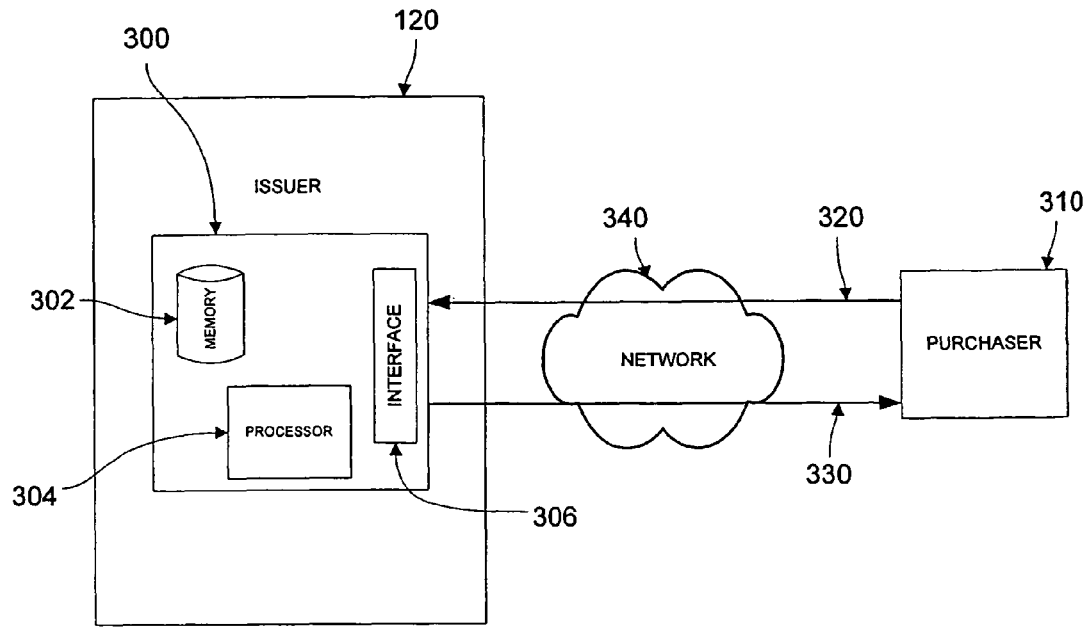
FIGS. 4A-4B illustrate an example data processing system for providing a financial instrument according to a particular embodiment.
Figure 4B:
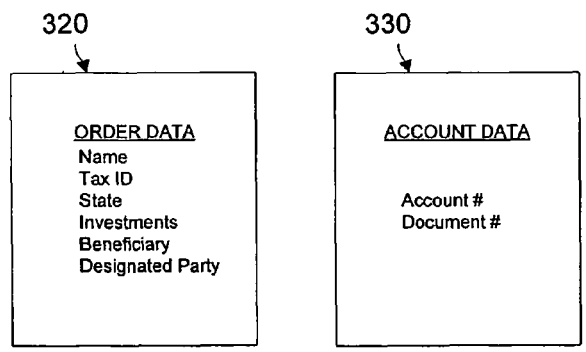

FIGS. 4A-4B illustrate an example data processing system 300 for providing financial instrument 100 according to a particular embodiment. While in certain embodiments financial instrument 100 is entered into without using a computer, other embodiments may have a computerized option for entering into an agreement. Data processing system 300 represents hardware and controlling logic for providing financial instrument 100. In the embodiment shown, data processing system 300 may include processing module 302, memory 304, and interface 306. As shown, data processing system 300 may be included as a system controlled by issuer 120. However, in other embodiments data processing system 300 may be external to issuer 120. Additionally, although data processing system 300 is shown as a single system, data processing system 300 may be distributed across multiple platforms housed in multiple locations, some or all of which may or may not be controlled by issuer 120.

Processing module 302 may control the operation and administration of elements within data processing system 300 by processing information received from interface 306 and memory 304. Processing module 302 may include any hardware and/or controlling logic elements operable to control and process information. For example, processing module 302 may be a computer, programmable logic device, a microcontroller, and/or any other suitable device or group of devices.

Memory 304 may store, either permanently or temporarily, data and other information for processing by processing module 302 and communication using interface 306. Memory 304 may include any one or a combination of volatile or nonvolatile local or remote devices suitable for storing information. For example, memory 304 may include random access memory (RAM), read only memory (ROM), magnetic storage devices, optical storage devices, or any other suitable information storage device or combination of these devices. Memory 304 may store, among other things, order data 320 and account data 330.

Interface 306 communicates information to and receives information from devices or systems coupled to data processing system 300. For example, interface 306 may communicate with other elements controlled by issuer 120, network 340, and/or elements coupled to network 340. Thus interface 306 may include any hardware and/or controlling logic used to communicate information to and from elements coupled to data processing system 300.

Network 340 represents communication equipment, including hardware and any appropriate controlling logic, for interconnecting elements coupled to network 340. Thus network 340 may represent a local area network (LAN), a metropolitan area network (MAN), a wide area network (WAN), and/or any other appropriate form of network. Furthermore, elements within network 340 may utilize circuit-switched, packet-based communication protocols and/or other communication protocols to provide for network communications. The elements within network 340 may be connected together via a plurality of fiber-optic cables, coaxial cables, twisted-pair lines, and/or other physical media for transferring communications signals. The elements within network 340 may also be connected together through wireless transmissions, including infrared transmissions, 802.11 protocol transmissions, laser line-of-sight transmissions, or any other wireless transmission method.

In operation, order data 320 may be transmitted from purchaser 310 to data processing system 300 through network 340. Data processing system may process order data 320, generate account data 330, and transmit account data 330 to purchaser 310 through network 340. Purchaser 310 may represent one or more customers 110 or purchaser 310 may represent one or more intermediaries acting on behalf of customers 110.

Order data 320 may include the name of account holder 112, one or more tax identifiers, the resident state of account holder 112, an initial investment allocation designation, and a designation of beneficiary 114 and/or designated party 116. Account data 330 may include an account number and a document, or reference to a document, containing the provisions of financial instrument 100.

Upon receipt of order data 320, data processing system 300 may calculate any applicable fees associated with the provisions of financial instrument 100. Data processing system may also identify account 130 and identify assets and fees associated with account 130.

In certain embodiments, purchaser 310 may initiate the transmission of order data 320 through the use of a web-based application. For example, purchaser 310 may access one or more websites and may submit certain portions of order data using those websites. Similarly, purchaser 310 may utilize one or more electronic fund transfer (EFT) technologies to purchase financial instrument 100. The use of internet technologies to purchase financial instrument 100 may involve the use of one or more security provisions such as digital signatures, digital certificates, passwords, and encryptions. In certain embodiments, the collection of order data 320 may occur through the use of an interactive process. For example, a web-based application may present a series of questions to purchaser 310, which purchaser 310 may respond to and, in responding, submit the contents of order data 320.

Figure 5:
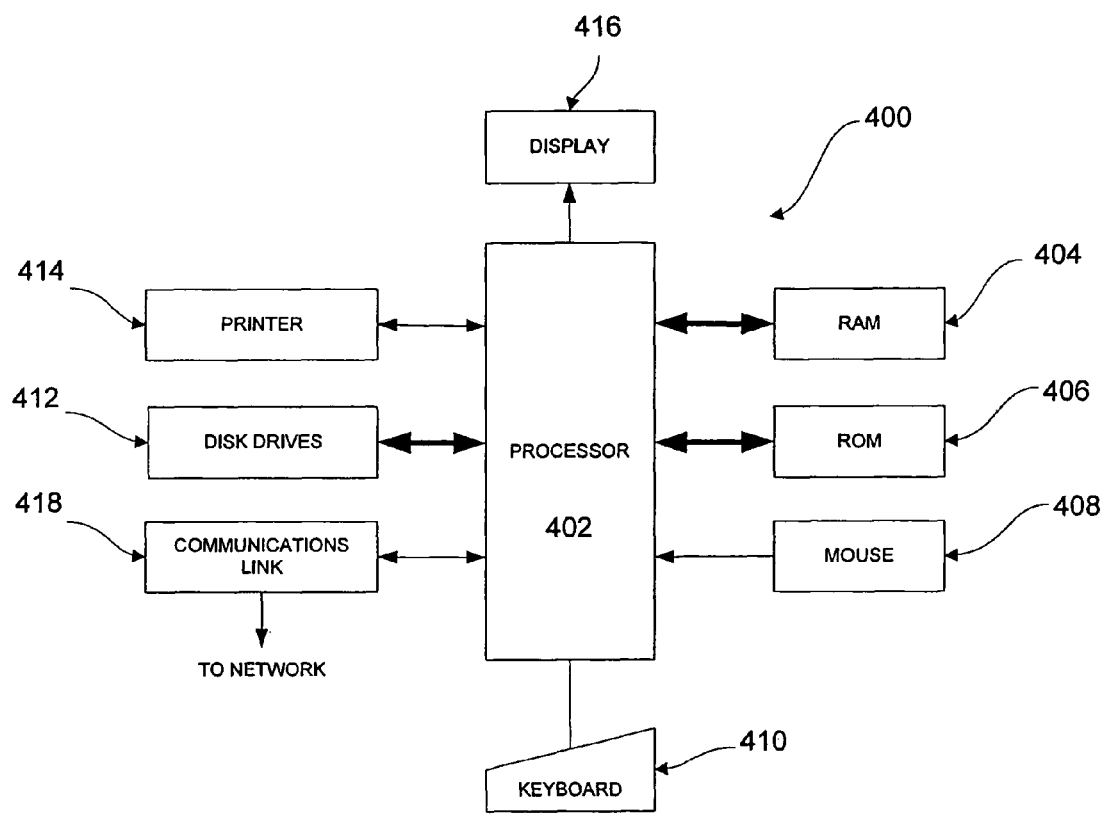
FIG. 5 illustrates an embodiment of a general purpose computer.

FIG. 5 is an embodiment of a general purpose computer 400 that may be used in connection with one or more pieces of software used to implement the invention. General purpose computer 400 may generally be adapted to execute any of the well-known OS2, UNIX, Mac-OS, Linux, and Windows Operating Systems or other operating systems. The general purpose computer 400 in this embodiment comprises a processor 402, a random access memory (RAM) 404, a read only memory (ROM) 406, a mouse 408, a keyboard 410 and input/output devices such as a printer 414, disk drives 412, a display 416 and a communications link 418. In other embodiments, the general purpose computer 400 may include more, less, or other component parts. Embodiments of the present invention may include programs that may be stored in the RAM 404, the ROM 406 or the disk drives 412 and may be executed by the processor 402. The communications link 418 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 412 may include a variety of types of storage media such as, for example, floppy disk drives, hard disk drives, CD ROM drives, DVD ROM drives, magnetic tape drives or other suitable storage media.

Although FIG. 5 provides one embodiment of a computer that may be used with the invention, the invention may additionally utilize computers other than general purpose computers as well as general purpose computers without conventional operating systems. Additionally, embodiments of the invention may also employ multiple general purpose computers 400 or other computers networked together in a computer network. Most commonly, multiple general purpose computers 400 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 5, the logic comprises computer software executable on the general purpose computer 400. The medium may include the RAM 404, the ROM 406 or the disk drives 412. In other embodiments, the logic may be contained within hardware configuration or a combination of software and hardware configurations. The logic may also be embedded within any other suitable medium without departing from the scope of the invention.

Although the present invention has been described in several embodiments, a plenitude of changes and modifications may be suggested to one skilled in the art, and it is intended that the present invention encompass such changes and modifications as fall within the present appended claims.

To aid the Patent Office, and any readers of any patent issued on this application in interpreting the claims appended hereto, applicants wish to note that they do not intend any of the appended claims to invoke ¶6 of 35 U.S.C. §112 as this paragraph and section exists on the date of filing hereof unless "means for" or "step for" are used in the particular claim.

What is claimed is:

1. A data processing system configured to manage a financial instrument comprising a guarantee of a minimum positive growth rate and a guarantee of a lifetime income, the data processing system comprising:
   one or more processors; and
   one or more memory modules, wherein at least one of the one or more memory modules comprises software configured, when executed by the one or more processors, to:
   store, in at least one of the one or more memory modules, an initial balance of an account created according to the financial instrument, wherein the financial instrument allows discretionary withdrawals from the account;
   store, in at least one of the one or more memory modules, a percentage value fixed upon an effective date of the guarantee of the lifetime income;
   store the minimum positive growth rate in at least one of the one or more memory modules;
   determine an updated account balance using the one or more processors, the determination based at least in part on a market performance of the account;
   store the updated account balance in at least one of the one or more memory modules;
   calculate a protected value using the one or more processors and the minimum positive growth rate, the protected value being at least equal to an amount based upon the initial account balance growing at the minimum positive growth rate for at least a defined period of time or until one or more defined events occur, whichever is sooner, wherein the protected value represents a positive rate of return provided by the guarantee of the minimum positive growth rate regardless of the market performance of the account; and
   calculate a transfer amount as a product of the percentage value multiplied by the protected value at the time of a particular event, wherein the guarantee of the lifetime income provides for periodic transfers to a beneficiary for the life of a designated party.

2. The system of claim 1, wherein the software is further configured, when executed by the one or more processors, to transfer to the beneficiary the transfer amount, wherein the transferring is either due to withdrawals from the account or due to benefit payments made to the beneficiary, provided that the transfer amount varies if the withdrawals from the account exceed a first particular limit defined by the financial instrument.

3. The system of claim 1, wherein the initial account balance is equal to an initial amount deposited into the account.

4. The system of claim 1, wherein the minimum positive growth rate is a fixed rate between four percent and six percent.

5. The system of claim 1, wherein the minimum positive growth rate is a variable rate.

6. The system of claim 5, wherein the minimum positive growth rate is based on a consumer price index.

7. The system of claim 1, wherein the protected value further comprises at least any positive value calculated by subtracting the amount based upon the initial account balance growing at the minimum positive growth rate from the updated account balance, at the end of the defined period of time or at the time of the one or more defined events occur.

8. The system of claim 1, wherein the initial account balance is based on an account balance from an existing contract.

9. The system of claim 1, wherein the percentage value is independent of the designated party's age.

10. The system of claim 1, wherein the percentage value is independent of the designated party's age and gender.

11. A method for administering a financial instrument comprising a guarantee of a minimum positive growth rate and a guarantee of a lifetime income, the method comprising:
    storing, in at least one memory module of one or more memory modules, an initial balance of an account created according to the financial instrument, wherein the financial instrument allows discretionary withdrawals from the account;
    storing, in at least one of the one or more memory modules, a percentage value fixed upon an effective date of the guarantee of the lifetime income;
    storing the minimum positive growth rate in at least one of the one or more memory modules;
    determining an updated account balance using one or more processors, the determination based at least in part on a market performance of the account;
    storing the updated account balance in at least one of the one or more memory modules;
    calculating a protected value using the one or more processors and the minimum positive growth rate, the protected value being at least equal to an amount based upon the initial account balance growing at the minimum positive growth rate for at least a defined period of time or until one or more defined events occur, whichever is sooner, wherein the protected value represents a positive rate of return provided by the guarantee of the minimum positive growth rate regardless of the market performance of the account; and
    using the one or more processors, calculating a transfer amount as a product of the percentage value multiplied by the protected value at the time of a particular event, wherein the guarantee of the lifetime income provides for periodic transfers to a beneficiary for the life of a designated party.

12. The method of claim 11, further comprising transferring to the beneficiary the transfer amount, wherein the transferring is either due to withdrawals from the account or due to benefit payments made to the beneficiary, provided that the transfer amount varies if the withdrawals from the account exceed a first particular limit defined by the financial instrument.

13. The method of claim 11, wherein the initial account balance is equal to an initial amount deposited into the account.

14. The method of claim 11, wherein the minimum positive growth rate is a fixed rate between four percent and six percent.

15. The method of claim 11, wherein the minimum positive growth rate is a variable rate.

16. The method of claim 15, wherein the minimum positive growth rate is based on a consumer price index.

17. The method of claim 11, wherein the protected value further comprises at least any positive value calculated by subtracting the amount based upon the initial account balance growing at the minimum positive growth rate from the updated account balance, at the end of the defined period of time or at the time of the one or more defined events occur.

18. The method of claim 11, wherein the initial account balance is based on an account balance from an existing contract.

19. The method of claim 11, wherein the percentage value is independent of the designated party's age.

20. The method of claim 11, wherein the percentage value is independent of the designated party's age and gender.

21. A method for administering a financial instrument comprising a guarantee of a minimum positive growth rate and a guarantee of a lifetime income, the method comprising:
storing, in at least one memory module of one or more memory modules, an initial balance of an account created according to the financial instrument, wherein the financial instrument allows discretionary withdrawals from the account;
storing, in at least one of the one or more memory modules, a percentage value fixed upon an effective date of the guarantee of the lifetime income;
storing the minimum positive growth rate in at least one of the one or more memory modules;
determining an updated account balance using one or more processors, the determination based at least in part on a market performance of the account;
storing the updated account balance in at least one of the one or more memory modules;
calculating a protected value using the one or more processors and the minimum positive growth rate, the protected value being at least equal to an amount based upon the initial account balance growing at the minimum positive growth rate for at least a defined period of time or until one or more defined events occur, whichever is sooner, wherein the protected value represents a positive rate of return provided by the guarantee of the minimum positive growth rate regardless of the market performance of the account; and
using the one or more processors, calculating a transfer amount as a product of the percentage value multiplied by the protected value at the time of a particular event, wherein the guarantee of the lifetime income provides for periodic transfers to one or more beneficiaries for the life of the longest surviving of a plurality of designated parties.

22. The method of claim 21, further comprising transferring to the one or more beneficiaries the transfer amount, wherein the transferring is either due to withdrawals from the account or due to benefit payments made to the one or more beneficiaries, provided that the transfer amount varies if the withdrawals from the account exceed a first particular limit defined by the financial instrument.

23. The method of claim 21, wherein the one or more beneficiaries comprise a married couple.

24. The method of claim 21, wherein the minimum positive growth rate is a variable rate.

25. The method of claim 24, wherein the minimum positive growth rate is based on a consumer price index.

26. The method of claim 21, wherein the protected value further comprises at least any positive value calculated by subtracting the amount based upon the initial account balance growing at the minimum positive growth rate from the updated account balance, at the end of the defined period of time or at the time of the one or more defined events occur.

27. The method of claim 21, wherein the initial account balance is based on an account balance from an existing contract.

28. The method of claim 21, wherein the percentage value is independent of the designated parties' ages.

29. The method of claim 21, wherein the percentage value is independent of the designated parties' ages and genders.

30. A method for administering a financial instrument comprising a guarantee of a minimum positive growth rate and a guarantee of a lifetime income, the method comprising:
storing, in at least one memory module of one or more memory modules, an initial balance of an account created according to the financial instrument, wherein the financial instrument allows discretionary withdrawals from the account;
storing, in at least one of the one or more memory modules, a percentage value fixed upon an effective date of the guarantee of the lifetime income;
storing the minimum positive growth rate in at least one of the one or more memory modules;
determining an updated account balance using one or more processors, the determination based at least in part on a market performance of the account;
storing the updated account balance in at least one of the one or more memory modules;
calculating a protected value using the one or more processors and the minimum positive growth rate, the protected value being at least equal to an amount based upon the initial balance growing at the minimum positive growth rate for a duration, the duration beginning at a first time and extending at least until a second time, wherein the second time is determined by an expiration of a specified period of time after the first time or by an occurrence of one or more defined events, whichever is sooner, wherein the protected value represents a positive rate of return provided by the guarantee of the minimum positive growth rate regardless of the market performance of the account; and
using the one or more processors, calculating a transfer amount as a product of the percentage value multiplied by the protected value at the time of a particular event, wherein the guarantee of the lifetime income provides for periodic transfers to a beneficiary for the life of a designated party.

31. The method of claim 30, further comprising transferring to the beneficiary the transfer amount, wherein the transferring is either due to withdrawals from the account or due to benefit payments made to the beneficiary, provided that the transfer amount varies if the withdrawals from the account exceed a first particular limit defined by the financial instrument.

32. The method of claim 30, wherein the first time is substantially equivalent to five years after the time at which the initial account balance is stored.

33. The method of claim 30, wherein the second time is substantially equivalent to the time at which a first discretionary withdrawal is made from the account.

34. The method of claim 30, wherein the minimum positive growth rate is a variable rate.

35. The method of claim 34, wherein the minimum positive growth rate is based on a consumer price index.

36. The method of claim 30, wherein the protected value further comprises at least any positive value calculated by subtracting the amount based upon the initial account balance growing at the minimum positive growth rate from the updated balance, at the second time.

37. The method of claim 30, wherein the initial account balance is based on an account balance from an existing contract.

38. The method of claim 30, wherein the percentage value is independent of the designated party's age.

39. The method of claim 30, wherein the percentage value is independent of the designated party's age and gender.

* * * * *